United States Patent [19]

Hunsucker

[11] 4,039,495

[45] Aug. 2, 1977

[54] WATER-DISPERSED COATING COMPOSITION OF SHORT OIL ALKYD RESIN AND TRIS(HYDROXYMETHYL)NITROMETHANE

[75] Inventor: Jerry Hoyt Hunsucker, Terre Haute, Ind.

[73] Assignee: IMC Chemical Group, Inc., Terre Haute, Ind.

[21] Appl. No.: 710,079

[22] Filed: July 30, 1976

[51] Int. Cl.² .................. C09D 3/64; C09D 5/02; C08L 35/02; C08L 33/14
[52] U.S. Cl. ...................... 260/22 R; 260/22 T; 260/29.2 E
[58] Field of Search ............... 260/22 R, 22 M, 22 T, 260/29.2 E

[56] References Cited

U.S. PATENT DOCUMENTS

| | | | |
|---|---|---|---|
| 3,226,348 | 12/1965 | Purcell et al. | 260/22 M |
| 3,699,066 | 10/1972 | Hunsucker | 260/29.2 E |
| 3,789,008 | 1/1974 | Young | 424/317 |

*Primary Examiner* — Ronald W. Griffin
*Attorney, Agent, or Firm* — Robert H. Dewey; Howard E. Post

[57] ABSTRACT

A water-dispersed coating composition of a short oil alkyd resin and tris(hydroxymethyl)nitromethane. The tris(hydroxymethyl)nitromethane improves the flexibility of coatings thereof without undue loss of hardness.

7 Claims, No Drawings

WATER-DISPERSED COATING COMPOSITION OF SHORT OIL ALKYD RESIN AND TRIS(HYDROXYMETHYL)NITROMETHANE

BACKGROUND OF THE INVENTION

This invention relates to a resin composition. In a particular aspect, this invention relates to an alkyd resin composition having improved flexibility.

Alkyd resins, i.e. the reaction product of a polyol with a mixture of a polybasic acid and a monobasic acid, are widely used in a baked coatings. The resins so used are only partially polymerized, dissolved in a suitable solvent, a catalyst is added and whatever pigmentation is desired and then applied to the article to be coated. The article is then heated or baked at an elevated temperature to cure the resin, i.e. to complete the polymerization. Alkyd resins are very successful in coatings of this type. If the amount of monobasic acid, e.g. a fatty acid, is large, the coating is very flexible, but unduly soft and easily scratched. However, if the amount of monobasic acid is relatively small, the resin suffers from the disadvantages of being very hard and lacking flexibility. Accordingly, there is a need to improve the flexibility of alkyd resin coatings without undue loss of hardness of such coatings.

SUMMARY OF THE INVENTION

It is an object of this invention to provide a resin composition.

It is another object of this invention to provide a resin composition having improved flexibility.

Other objects of this invention will be apparent to those skilled in the art from the disclosure herein.

It is the discovery of the present invention to provide a water-dispersed composition consisting essentially of an amine-neutralized short-oil alkyd resin having a high acid number and from 20% to 55% by weight based on the alkyd resin of tris (hydroxymethyl) nitromethane. The tris (hydroxymethyl)-nitromethane (hereinafter referred to as TN) acts as a cross-linking agent and improves the flexibility of the short oil alkyd without undue loss of hardness.

DETAILED DESCRIPTION

It is contemplated that the composition of the present invention will be in the form of a water-based coating which is applied to an article to be coated by any convenient means, e.g. by brushing, dipping, spraying, or electrostatic spraying, all of which methods are well known in the art. The formulation of such coatings is also well-known in the art. In general, a short-oil alkyd resin having a high acid number, e.g. of about 35 to 65, is neutralized with ammonia, an alkyl amine, such as morpholine, or an alkanolamine whereupon it becomes water-soluble. The solution thereby obtained can be used, without additional components, but usually it is preferred to add a modifier, e.g. a phenol-formaldehyde or urea-formaldehyde resin, a metallic drying catalyst, and color agent such as a pigment or dye. It is contemplated that any of the formulations known in the art can be used in the practice of the present invention, since the invention is directed to the use of TN in such formulations.

In general, an alkyd resin is the product obtained by reacting a mixture of dibasic and/or tribasic acids and a monobasic acid with a polyol. Typical polybasic acids include the phthalic acids and phthalic anhydride, maleic anhydride, fumaric acid and trimellitic anhydride. Typical polyols include ethylene glycol and diethylene glycol, glycerol, trimethylolethane, trimethylolpropane, mono-, di-, and tri-pentaerythritols and sorbitol. The degree of polymerization is controlled by the reaction and is indicated by the acid number, a high acid number being indicative of free carboxyl groups which usually indicate incomplete polymerization.

A fatty acid, usually an unsaturated one such as linoleic or linolenic, is usually included to provide flexibility in the finished resin. Either the free fatty acid or sources thereof are used in the reaction mixture. Typical sources of fatty acids include natural oils such as linseed, soybean, safflower, tall, fish, tung, oiticica, castor, dehydrated castor, coconut and cottonseed. Also lauric, pelargonic, isodecanoic and isooctanoic acids isooctanoic used in minor amounts as substitutes for part of the fatty acids to terminate the polymer or modify the properties of the resin. Commonly used non-fatty, monobasic acids include benzoic, butyl benzoic and dimethylolpropionic acids. Other modifiers include resins such as rosin, phenol-formaldehyde, urea-formaldehyde, styrene, alpha methyl styrene, vinyl toluene, acrylic esters and silicone intermediates, as is well-known in the art.

Depending on the amount of fatty acid present, the resin is denoted as a short oil, medium oil or long oil length alkyd. The short oil resins are typically hard and rather brittle, whereas the long oil resins are flexible but lack hardness. A resin having from about 33-48% - or even as low as 25% - oil is generally known as a short oil alkyd. The range of 43-48% is sometimes referred to as a short medium oil alkyd. No sharp line of demarcation between these categories is recognized in the art.

The water-based coating of the present invention can be formulated with any of the short oil alkyl resins, e.g. of from about 25 to 48% oil length, having a high acid number of 35-65, or even above, although an oil length of from 33 to 43% is preferred. The alkyd is neutralized in the presence of water with a suitable neutralizing agent, many of which are known in the art, e.g. ammonia, morpholine, mono-, di- or triethanolamine, the isopropanolamines, 2-amino-2-methyl- 1-propanol, the ethylamines, the propylamines, etc., or mixtures thereof, whereupon it becomes water-soluble. The solubilized resin is then diluted with sufficient water to yield a desired viscosity and solids content. Typically the water content of the finished formulation will be in the range of 35-45% by weight. From about 20 % to about 51% of tris(hydroxymethyl) nitromethane, based on the weight of the alkyd resin, is then incorporated in the formulation. Any of the catalysts, pigments, dyes, modifying resins or other additives known in the art can also be added to desired. When used, the coating should be baked at a temperature above 120° C, preferably at 135°-150° C.

Tris (hydroxymethyl) nitromethane is known in the art. It is commercially available, or it can be prepared by condensing nitromethane with formaldehyde in a mole ratio of about 1:3, respectively, as is known in the art.

The invention will be better understood with reference to the following examples. It is understood, however, that the examples are intended only to illustrate the invention and it is not intended that the invention be limited thereby.

EXAMPLE 1

A commercially-available, water soluble type short oil alkyd resin was formulated into a typical water-based coating. The resin used was Aquamac 1085, manufactured by the Resin Division, IMC Chemical Group, Inc., Carpentersville, Illinois 60110. This resin is prepared by reacting the following ingredients.

| | |
|---|---|
| *Unsaturated tall oil fatty acid | 31.2 parts |
| Benzoic acid | 1.7 parts |
| Trimethylolethane | 29.4 parts |
| Isophthalic acid | 29.4 parts |
| Trimellitic anhydride | 8.3 parts |

*Pamolyn 200 marketed by Hercules, Inc.

The resulting product had an oil length of about 33% and acid value of 50-60. It was dissolved in a mixture of butoxyethanol and isobutyl alcohol in a 2:1 by volume ratio to provide a solids content of about 70% by weight.

| | |
|---|---|
| Alkyd resin (70% solids basis) | 26.5 g |
| Triethylamine | 2.2 g |
| Water | 40.0 g |
| Metallic drier (6% Mn) | 0.1 g |
| Butoxyethanol | 7.2 g |
| Methylated urea-formaldehyde resin | 12.5 g |
| p-Nitrotoluene sulfonic acid | 1.0 g |
| Total | 89.5 g |

The above formulation was duplicated except that 3.62 g of TN was added, equal to 20% based on the weight of the alkyd. Each formulation was used to coat three steel panels with a 3 mil wet coating. They were then baked for 15 minutes at 120°, 135° and 150° C respectively. The panels were tested for flexibility by reverse impact and mandrel bend and for hardness. The results are given in Table 1. They show that the TN contributes superior flexibilty without significant loss of hardness.

EXAMPLES 2-4

The experiment of Example 1 was repeated in all essential details except the amount of TN added was 5.51, 7.25 and 8.29 g respectively, equivalent to 33, 43 and 51% respectively, based on the dry weight of the alkyd resin. The results are given in Table 1.

TABLE 1

| | Reverse Impact, inches/lb | Pencil Hardness | Mandrel Bend, inches |
|---|---|---|---|
| Control at 120° C | 55 | 2H | 3/16 |
| 135° C | 30 | 5H | 3/16 |
| 150° C | 20 | 9H | 1/8 |
| Example 1, 120° C | 50 | F | 1/8 |
| 135° C | 40 | 4H | 1/8 |
| 150° C | 40 | 5H | 1/8 |
| Example 2, 120° C | 38 | HB | 1/8 |
| 135° C | 47 | 2H | 1/8 |
| 150° C | 35 | 4H | 1/8 |
| Example 3, 120° C | 32 | B | 1/8 |
| 135° C | 65 | H | 1/8 |
| 150° C | 70 | 5H | 1/8 |
| Example 4, 120° C | 42 | 3B | 1/8 |
| 135° C | 78+ | 2H | 1/8 |
| 150° C | >80 | 4H | 1/8 |

It was concluded that 120° C was too low a bake temperature, but 135° C and 150° C bake give excellent results. The minor decrease in hardness at 135°or 150°is not regarded as adverse, especially in view of the superior flexibility as manifested by the improvement in the reverse impact test.

EXAMPLES 5-20

The experiment of Example 1 is repeated in all essential details except that the alkyd resin is prepared from different polyols and acids. The polyols, polybasic acids and fatty acids used are listed in the following Table 2. The ratios thereof and the reaction times are selected by known methods to provide the oil lengths and the acid numbers listed. The TN significantly improves the flexibility of coatings prepared from the alkyd resins with only minor effect on the hardness.

TABLE 2

| Example Number | Polyol | Dibasic Acid | Fatty Acid or Oil | Oil Length | Acid Number |
|---|---|---|---|---|---|
| 6 | Ethylene Glycol | Phthalic Anhydride | Linseed Oil | 33 | 35 |
| 7 | Diethylene glycol | Terephthalic Acid | Soybean Oil | 43 | 45 |
| 8 | Glycerol | Maleic Anhydride | Safflower Oil | 45 | 41 |
| 9 | Trimethylolpropane | Fumaric Acid | Fish Oil | 35 | 37 |
| 10 | Pentaerythritol | Phthalic Anhydride | Tung Oil | 38 | 48 |
| 11 | Dipentaerythritol | Isophthalic Acid | Oiticica Oil | 44 | 52 |
| 12 | Tripentaerythritol | Trimellitic Anhydride | Castor Oil | 46 | 46 |
| 14 | Trimethylolethane | Maleic Anhydride | Dehydrated Castor Oil | 34 | 56 |
| 15 | Glycerol | Fumaric Acid | Coconut Oil | 37 | 39 |
| 16 | Ethylene Glycol | Phthalic Anhydride | Cottonseed Oil | 35 | 60 |
| 17 | Pentaerythritol | Phthalic Anhydride | Lauric Acid | 40 | 44 |
| 18 | Diethyleneglycol | Phthalic Anhydride | Pelargonic Acid | 41 | 65 |
| 19 | Dipentaerythritol | Phthalic Anhydride | Isodecanoic Acid | 34 | 38 |
| 20 | Trimethylolpropane | Phthalic Anhydride | Isooctanoic Acid | 45 | 40 |

I claim:

1. A water-dispersed coating composition consisting essentially of a short oil alkyd resin and tris (hydroxymethyl)nitromethane in a concentration of 20% to about 55% by weight of the resin.

2. The composition of claim 1 wherein the alkyd resin has an oil length of from about 33 to about 48.

3. The composition of claim 1 wherein the alkyd resin has an acid number of from about 35 to about 48.

4. The composition of claim 1 wherein the tris-(hydroxymethyl)nitromethane is present in an amount of 20% based on the weight of the resin.

5. The composition of claim 1 wherein the tris-(hydroxymethyl)nitromethane is present in an amount of about 33%.

6. The composition of claim 1 wherein the tris-(hydroxymethyl)nitromethane is present in an amount of about 43%.

7. The composition of claim 1 wherein the tris-(hydroxymethyl)nitromethane is present in an amount of about 55%.

* * * * *

UNITED STATES PATENT AND TRADEMARK OFFICE
CERTIFICATE OF CORRECTION

PATENT NO. : 4,039,495
DATED     : August 2, 1977
INVENTOR(S) : Jerry H. Hunsucker It is certified that error appears in the above-identified patent and that said Letters Patent are hereby corrected as shown below:

Column 1, line 12, delete "a"

Column 2, line 17, delete "isooctanoic" and substitute --are--

Column 2, line 56, delete "to" and substitute --as--

Column 3, line 1, "EXAMPLE 11" should read --EXAMPLE 1--

Column 3, line 22, Before the formula insert as a new paragraph
--The formula for the water-based coating was as follows:--

*Signed and Sealed this*

*Twentieth* Day of *December 1977*

[SEAL]

*Attest:*

RUTH C. MASON
*Attesting Officer*

LUTRELLE F. PARKER
*Acting Commissioner of Patents and Trademarks*